(12) United States Patent
Keralapura et al.

(10) Patent No.: US 8,578,024 B1
(45) Date of Patent: Nov. 5, 2013

(54) NETWORK APPLICATION SIGNATURES FOR BINARY PROTOCOLS

(75) Inventors: Ram Keralapura, San Jose, CA (US); Ruben Torres, Sunnyvale, CA (US); Marios Iliofotou, Sunnyvale, CA (US); Alok Tongaonkar, Sunnyvale, CA (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 129 days.

(21) Appl. No.: 13/343,984

(22) Filed: Jan. 5, 2012

(51) Int. Cl.
*G06F 15/16* (2006.01)

(52) U.S. Cl.
USPC .......................................... 709/224; 709/236

(58) Field of Classification Search
USPC .................................... 709/224, 236
See application file for complete search history.

(56) References Cited

U.S. PATENT DOCUMENTS

2007/0030926 A1* 2/2007 Brown et al. ................. 375/340

OTHER PUBLICATIONS

Finamore, Alessandro, et al., "KISS: Stochastic Packet Inspection Classifier for UDP Traffic", IEEE/ACM Transactions on Networking, vol. 18, No. 5. (Oct. 2010), pp. 1505-1515.

Ma, Justin, et al., "Unexpected Means of Protocol Inference", IMC '06 Proceedings of the 6th ACM Sigcomm Conference on Internet Measurement (2006).

Haffner, Patrick, et al., "ACAS: Automated Construction of Application Signatures", MineNet '05 Proceedings of the 2005 ACM SIGCOMM Workshop on Mining Network Data (Aug. 2005), pp, 197-202.

* cited by examiner

*Primary Examiner* — Thomas Dailey
*Assistant Examiner* — Ebrahim Golabbakhsh
(74) *Attorney, Agent, or Firm* — Fernandez & Associates, LLP

(57) ABSTRACT

A method for profiling network traffic of a network, including defining a set of features each corresponding to a set of pre-determined bit positions for selecting a pre-determined number of data bits from each flow in a flow set generated by a network application to form a feature value assigned to the feature for the each flow, identifying the feature as a deterministic feature based on a frequency of occurrence of the feature value, extracting a set of paths from the flow set based on a number of deterministic features, generating a state machine based on the set of paths, and analyzing a new flow associated with a server in the network to determine the server as executing the network application.

22 Claims, 9 Drawing Sheets

NETWORK APPLICATION SIGNATURES FOR BINARY PROTOCOLS

BACKGROUND OF THE INVENTION

1. Field of the Invention

The present invention relates to computers and computer networks. More particularly, the invention relates to profiling Internet traffic flows to identify network applications responsible for the traffic flows.

2. Background of the Related Art

There has been an increase on the use of UDP-based binary protocols to carry not only control messages but also data. Examples of UDP-based binary protocols include RTP, RTCP, DNS, etc. Since UDP is not connection-oriented, the application header must be carried in every packet. Different from plain text protocols (e.g. HTTP, SMTP), the fields in the application header of UDP flows (i.e., flows originating from UDP-based binary protocols) are separated by bit chunks as opposed to string words. Current proposals to identify UDP-based binary protocols are either not practical since they require UDP flows to be long or they require heavy reverse engineering, such as traditional Deep Packet Inspection (DPI). Keeping up with the number of applications that come up everyday is impractical due to the laborious manual reverse engineering process. Reverse engineering all these applications in a timely manner requires a huge manual effort. As a consequence, keeping a comprehensive and up-to-date list of application signatures is infeasible.

SUMMARY

Generally, embodiments of the invention provide a system and method to develop accurate payload content based signatures without manual intervention for individual application (also referred to as application layer protocol) such that they can be used for real-time classification of flows. The architecture described herein decouples the real-time traffic classifier from the offline signature generation algorithms executed in an offline training phase. All the flows that are not labeled by the real-time classifier are grouped together as a flow-set based on a pre-determined criterion (e.g., common (port number, transport protocol) pair shared by each flow of the flow-set) and sent to the signature generation module, which uses offline signature generation algorithms during an offline training phase with no real-time performance constraint for extracting application signatures.

In general, in one aspect, the present invention relates to a method for profiling network traffic of a network. The method includes obtaining, from the network traffic, a plurality of flows associated with a network application, wherein each of the plurality of flows comprises a sequence of data bits, defining a plurality of features for the plurality of flows based on a pre-determined criterion, wherein a feature of the plurality of features corresponds to a plurality of pre-determined bit positions in the sequence of data bits for selecting a pre-determined number of data bits from the sequence of data bits, and wherein the pre-determined number of data bits are selected from the sequence of data bits for the each of the plurality of flows to form a feature value assigned to the feature for the each of the plurality of flows, identifying, by a processor of a computer system, the feature as one of a plurality of deterministic features for the network application based on a frequency of occurrence of the feature value in the plurality of pre-determined bit positions for all of the plurality of flows exceeding a pre-determined frequency threshold, wherein the feature value is identified as one of a plurality of deterministic feature values corresponding to the plurality of deterministic features, extracting, by the processor, a plurality of paths from the plurality of flows, wherein each of the plurality of paths comprises at least two deterministic features and is extracted from a flow, of the plurality of flows, having at least two deterministic feature values for the at least two deterministic features, respectively, generating, by the processor, a state machine based on the plurality of paths, wherein a state in the state machine corresponds to a selected deterministic feature in the plurality of paths, wherein a state transition in the state machine corresponds to two sequential deterministic features selected from the plurality of paths, wherein the selected deterministic feature and the two sequential deterministic features are selected based on a pre-determined algorithm, and analyzing, by the processor and based on the state machine, a new flow separate from the plurality of flows and associated with a server in the network to determine the server as executing the network application.

Other aspects and advantages of the invention will be apparent from the following description and the appended claims.

DETAILED DESCRIPTION

Figure 1:
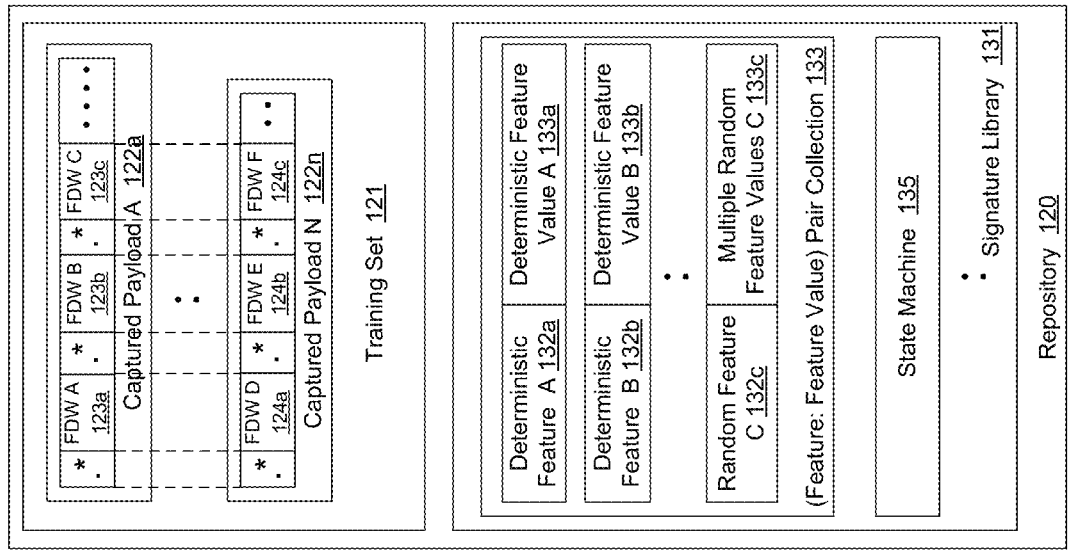
FIG. 1 shows a system block diagram according to aspects of the invention.
Figure 1:
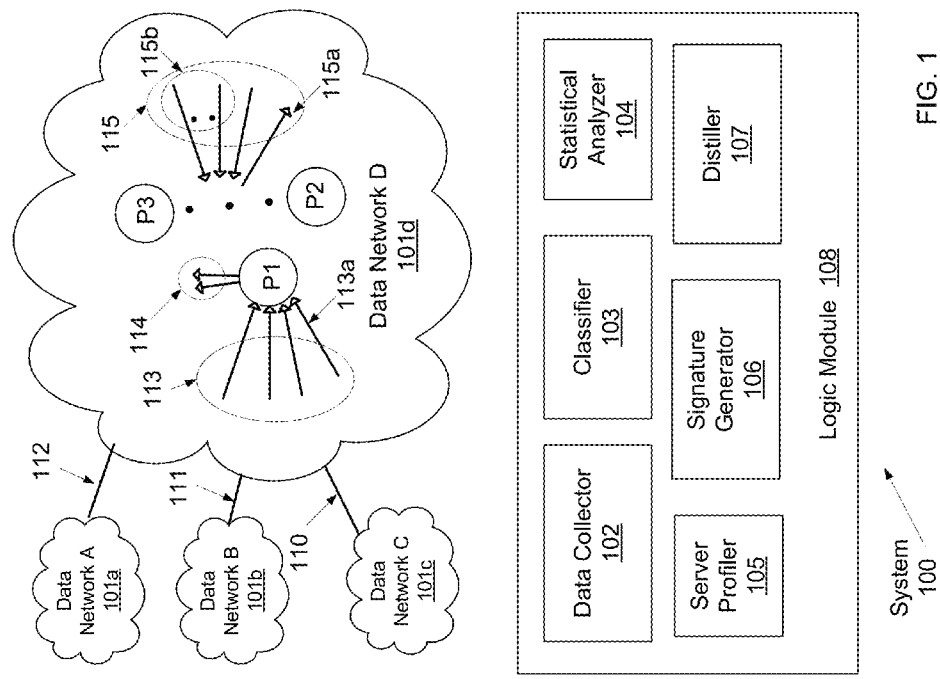

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally, a flow (or traffic stream) between two network hosts is a series of data records (referred to as packets or data packets) regarding the communication between the two network hosts engaged in an Internet transaction. The Internet transaction may be related to completing a task, which may be legitimate or malicious. Each packet includes a block of data (i.e., actual packet content referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise.

Further, the term "transport protocol" refers to a protocol associated with or based on top of a transport layer of a computer network. For example, the transport protocol may be referred to as layer-four protocol with respect to the OSI model (i.e., Open Systems Interconnection Reference Model of the network architecture). Examples of layer-four protocols include TCP, UDP, etc.

Further still, the term "application" or "network application" refers to an application associated with or based on top of an application layer of a computer network while the term "signature" or "packet content signature" refers to an application layer packet content based signature. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent®, GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy. Throughout this disclosure, a complete network packet including packet header and complete packet payload may be referred to as a full payload packet while the complete packet payload may be referred to as a full packet payload. The term "payload" may refer to full packet payload, partial packet payload, a collection of full/partial packet payloads within a flow or a portion thereof, in an interchangeable manner depending on the context unless explicitly stated otherwise.

In one or more embodiments of the invention, when full payload packets of input flows are received, a real-time classifier first reconstructs flows and then makes an attempt to label these flows using any existing packet content based signatures. If the classifier successfully labels a flow, then the result is recorded in a database. The classification process for the flow ends. However, if the classifier cannot label the flow, then the flow is sent to a packet content signature generation process. Also, the classifier sends the server IP-address used in the flow to a server profiler. The main task of the server profiler is to find the application/protocol associated with the IP-address. Based on the flow(s) from the classifier and application/protocol name from the server profiler, a statistical analyzer first forms a cohesive flow-set by grouping the flows received from the classifier that share same characteristics (e.g., common (port number, transport protocol) pair), and a signature generator subsequently extracts a set of signature terms to form a signature for the flow-set.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the system (100) includes data networks A through D (101a, 101b, 101c, 101d), a logic module (108), and a repository (120). Each of these networks A through D may be a portion of a larger network and are shown to be coupled via links (110, 111, 112). The network D (101d) includes hosts (P1, P2, P3, etc.). As shown, host (P1) is a source or destination associated with flows (113, 114) while hosts (P2, P3, etc.) are source(s) or destination(s) associated with flows (115). Accordingly, the flows (113, 114) are referred to as attached to the server (P1) while the flows (115) are referred to as attached to the servers (P2, P3, etc.). In particular, the flows (113) include a particular flow (113a) while the flows (115) include another particular flow (115a). Further, a portion of the flows (115) is a set of unidirectional flows (115b). Each flow (e.g., flow (113a), flow (115a)) in these flows (113, 114, 115) includes full payload packets. In one or more embodiments of the invention, each flow in these flows (113, 114, 115) relates to an application executing on the attached server at a particular time. For example, flows (113) may include DNS QUERY commands sent from various clients to the server (P1) while the flows (114) may include DNS RESPONSE commands sent from the server (P1) to various clients. Accordingly, the flows (113, 114) are referred to as "associated with an application executing on server (P1)", "corresponding to an application executing on server (P1)", "generated by an application executing on server (P1)", "generated to execute an application on server (P1)", or "generated for executing an application on server (P1)" in an interchangeable manner depending on the context unless explicitly stated otherwise.

As shown in FIG. 1, the logic module (108) includes a data collector (102), a classifier (103), a statistical analyzer (104), a server profiler (105), a signature generator (106), and a distiller (107). The data collector (102), the classifier (103), and the statistical analyzer (104) may be referred to as a stream processor or a flow processor.

Further as shown in FIG. 1, the repository (120) includes a training set (121) and a signature library (131). The training set (121) is shown to include a number of captured payloads A through N (122a, 122b, 122n, etc.) each including a sequence of packet payloads captured from one flow (e.g., a flow in the flows (115)). In one or more embodiments, such sequence of packet payloads is captured from a portion (e.g., the first 24 payload bytes) of such one flow. In one or more embodiments, a packet payload in such sequence of packet payloads is a full packet payload, or a portion thereof, in one packet of the flow. In particular, the sequence of packet payloads included in a captured payload (e.g., captured payload A (122a)) consists of packet payloads extracted from multiple packets and concatenated according to an order based on sequence information contained in corresponding packet headers. In one or more embodiments, packet headers (not shown), or information derived therefrom, may also be included in the training set (121) where each packet header, or information derived therefrom, is linked to a corresponding captured payload or a packet payload contained therein. In one or more embodiments, the training set (121) is extracted from a collected flow-set (not shown) and separately stored in the repository (120). In one or more embodiments, the training set (121) is embedded in a collected flow-set (not shown) that is stored in the repository (120). In such embodiments, the captured payloads (e.g., captured payload A (122a)) are extracted from the flow-set as needed during processing for signature extraction. In one or more embodiments, a captured payload (e.g., captured payload A (122*a*)) is extracted in real time as a flow is obtained. In such embodiments, such captured payload is stored in the repository (120) to form the training set (121) without storing a separate flow-set in the repository (120).

In one or more embodiments, each captured payload (e.g., captured payload A (122*a*)) in the training set (121) is considered as a sequence of data bits (e.g., binary data bits from multiple packets in the captured payload) within which multiple segments of consecutive data bits at pre-determined positions in the sequence are designated as a set of feature defining windows (FDWs). As shown in FIG. 1, each sequence of data bits in captured payload A (122*a*) through captured payload N (122*n*) starts from the left and extends to the right representing a progression in time. Said in other words, a position in the sequence of data bits to the left represents a data bit that occurs logically earlier in the transmission than a position in the sequence of data bits to the right.

In one or more embodiments, the pre-determined positions are aligned from the beginning of the sequence of data bits across all captured payloads in the training set (121). Said in other words, these sets of feature defining windows for different captured payloads are aligned from the beginning of all captured payloads in the training set (121).

In one or more embodiments, the pre-determined positions for each captured payload start from a starting bit in the sequence of data bits where each starting bit may have a different position in different captured payload in the training set (121). Said in other words, these sets of feature defining windows for different captured payloads can be aligned by sliding some of the captured payloads against each other in the training set (121). In one or more embodiments, at least a portion of the pre-determined positions for each captured payload are located within the beginning portion of the packet that contains the application header of the UDP-based binary protocol, which is typically contained within the first 12-48 bytes in every packet since UDP is not connection oriented.

In one or more embodiments, all feature defining windows have a fixed length, such as four data bits. Said in other words, each feature defining window corresponds to a data nibble in the sequence of data bits. In one or more embodiments, whether having variable lengths or a fixed length, all feature defining windows in any captured payloads are consecutive. An example where these feature defining windows are consecutive and have a fixed length may use first 48 consecutive nibbles at the beginning of each captured payload to define 48 features. Accordingly, each feature corresponds to one nibble indexed by a nibble count starting from the beginning of each captured payload. Further, features in different captured payloads that have the same nibble count index are aligned to each other.

As shown in FIG. 1, the captured payload A (122*a*) includes three feature defining windows FDW A (123*a*), FDW B (123*b*), and FDW C (123*c*) interposed in wildcard data bit segments each denoted as (.*). The captured payload N (122*n*) includes three feature defining windows FDW D (124*a*), FDW E (124*b*), and FDW F (124*c*) interposed in wildcard data bit segments each denoted as (.*). Throughout this disclosure, a wildcard data bit segment (.*) refers to a data bit segment having non-pre-determined number of data bits. In the example shown in FIG. 1, captured payload A (122*a*) and captured payload N (122*n*) are aligned at the beginning of their respective sequences of data bits. Further, FDW A (123*a*), FDW B (123*b*), and FDW C (123*c*) are aligned to FDW D (124*a*), FDW E (124*b*), and FDW F (124*c*), respectively as indicated by the dashed lines. Note that while the beginnings of the captured payload A (122*a*) and captured payload N (122*n*) are aligned as indicated by a dash line, the two payloads may have different lengths indicated by the dotted lines and therefore may not be aligned at the ends of the respective sequences of data bits. Also note that those wildcard data bit segments (.*) interposed between two aligned FDW pairs have the same length. For example, the wildcard data bit segment (.*) interposed between FDW A (123*a*) and FDW B (123*b*) has the same length as the wildcard data bit segment (.*) interposed between FDW D (124*a*) and FDW E (124*b*). In a particular example where all FDWs are consecutive in each captured payload and have the same fixed length, each of FDW A (123*a*), FDW B (123*b*), FDW C (123*c*), FDW D (124*a*), FDW E (124*b*), and FDW F (124*c*) is a data nibble where all wildcard data bit segments (.*) shown in captured payload A (122*a*) and captured payload N (122*n*) are null (i.e., of zero length). For example, 24 features may be defined using first 96 bits in each captured payload in the training set (121). Specifically, FDW A (123*a*), FDW B (123*b*), and FDW C (123*c*) correspond to bit 0 through bit 3, bit 4 through bit 7, and bit 8 through bit 11, respectively, of the sequence of data bits among the first 24 nibbles in the sequence of data bits of the captured payload A (122*a*). Similarly, FDW D (124*a*), FDW E (124*b*), and FDW F (124*c*) correspond to bit 0 through bit 3, bit 4 through bit 7, and bit 8 through bit 11, respectively, of the sequence of data bits among the first 24 nibbles in the sequence of data bits of the captured payload N (122*n*). Accordingly, FDW A (123*a*) and FDW D (124*a*) correspond to feature F0, FDW B (123*b*) and FDW E (124*b*) correspond to feature F1, FDW C and FDW F (124*c*)) correspond to feature F2, etc. where F0 through F23 represent the aforementioned 24 example features.

In one or more embodiments, the signature generator (106) is configured to identify bit patterns in each FDW for each captured payload in the training set (121) as individual feature value of the particular captured payload corresponding to the particular FDW. In the example where F0 through F23 represent the aforementioned 24 example features correspond to the first 24 data nibbles in each captured payload, the BCD (binary coded decimal) value of bit 0 through b2 in captured payload A (122*a*) is the feature value of F0 for captured payload (122*a*). Depending on the specific bit pattern of bit 0 through bit 3 in captured payload A (122*a*), F0 for captured payload A (122*a*) may have a feature value of any one of 0 through 15. Similarly, depending on the specific bit pattern of bit 0 through bit 3 in captured payload N (122*n*), F0 for captured payload N (122*n*) may also have a feature value of any one of 0 through 15.

In one or more embodiments, all captured payloads in the training set (121) are identified as being generated from a single network application (e.g., a binary network protocol such as RTP, RTCP, DNS, etc.). In one or more embodiments, the signature generator (106) is further configured to identify a feature (e.g., F0, F1, etc.) as one of a number of deterministic features for the network application by tallying a frequency of occurrence of one or more feature values occurring in the corresponding FDW throughout all of the captured payloads in the training set (121). In general, each feature may have multiple feature values across all captured payload in the training set (121) that form a distribution of feature values. Certain feature may have concentrated feature value distribution while other feature may have randomly distributed feature values. When a particular (feature: feature value) pair has a high frequency of occurrence exceeding a pre-determined frequency threshold, this feature is identified as one of a number of deterministic features and the feature value is identified as one of a number of deterministic feature values corresponding to the number of deterministic features. A feature with randomly distributed feature values and does not have any feature value occurring more frequently to exceed the pre-determined frequency threshold is designated as a random feature have random feature values.

In one or more embodiments, the signature generator (106) is further configured to generate the state machine (135) based on the deterministic features and deterministic feature values of the training set (121). The state machine (135) is referred to as the signature of the network application (e.g., a binary network protocol such as RTP, RTCP, DNS, etc.). More details of identifying features, extracting feature values, and generating the signature(s) of a binary network application are described in reference to FIGS. 2A-3E below.

The signature library (131) is shown to include a (feature: feature value) pairs collection (133) and a state machine (135). As shown, the (feature: feature value) pairs collection (133) includes (deterministic feature A (132a): deterministic feature value A (133a)), (deterministic feature B (132b): deterministic feature value B (133b)), (random feature C (132c): random feature values C (133c)), etc. Specifically, deterministic feature A (132a) corresponds to FDW A (123a) and FDW D (124a) among other aligned FDWs in other captured payloads in the training set (121) where the feature values have a concentrated distribution with the most frequently occurring feature value identified as the deterministic feature value A (133a). Deterministic feature B (132b) corresponds to FDW B (123b) and FDW E (124b) among other aligned FDWs in other captured payloads in the training set (121) where the feature values have a concentrated distribution with the most frequently occurring feature value identified as the deterministic feature value B (133b). Random feature C (132c) corresponds to FDW C (123c) and FDW F (124c) among other aligned FDWs in other captured payloads in the training set (121) where the feature values have a random distribution with randomly occurring feature values identified as the random feature values C (133c).

In one or more embodiments, the data collector (102) is configured to obtain, from the network traffic (e.g., including all of flows (113), flows (114), flows (115), etc.), a flow-set (i.e., a set of flows, such as one or flows (113), flows (114), flows (115), flows (115b), etc.) associated with a number of servers (e.g., server (P1), server (P2), server (P3), etc.) executing one or more network applications in the network. Specifically, the data collector (102) may observe and collect, for example from links (110, 111, 112), information regarding network traffic when available and to filter and organize the collected traffic data regarding duplicate records or out-of-order records. Accordingly, the collected traffic data is reconstructed to represent data packets of a flow in an appropriated order (e.g., based on sequence information in the headers) consistent with the Internet transaction performed by the flow. Throughout this disclosure, "obtaining a flow" may refer to obtaining a complete flow or any portion thereof depending on the context unless explicitly stated otherwise.

In one or more embodiments, the output of the data collector (102) includes a captured payload (e.g., captured payload A (122a), etc.) of a flow (e.g., flow (113a), flow (115a)) and is provided to the classifier (103) configured to either identify an application (e.g., RTP, RTCP, DNS, etc.) (e.g., associated with the flow (113a)) or to pass information (e.g., a captured payload or a reference thereof) of a not-yet-identifiable flow (e.g., flow (115a)) to the statistical analyzer (104). In particular, the captured payloads (e.g., captured payload A (122a), etc.), when included in the training set (121), are already processed by the data collector (102) regarding duplicate records or out-of-order records based on corresponding packet headers.

In one or more embodiments, the classifier (103) is configured to classify the flows collected and processed by the data collector (102) in real time using a list of known signatures (e.g., state machine (135)) in the signature library (131), which are previously extracted/generated by the signature generator (106). For example, concurrently with a portion of a flow being generated in response to the attached server executing a network application to complete a task (e.g., by performing an Internet transaction), data packets (e.g., the first 24 or 48 nibbles in the payload) in the portion of the flow are processed by the classifier (103) in an expedient manner to identify the particular network application prior to the task or the flow being completed by the attached server. Every flow received from data collector (102) for which a signature is available is classified (i.e., associated with an application) and promptly reported to the end-user (not shown). Accordingly, an alert may be generated in time to block a malicious flow aimed at performing a malicious Internet transaction or other malicious task.

In one or more embodiments, when an unknown flow (i.e., flow (115a)) for which a signature is not yet available in the signature library (131)) is observed, the classifier (103) forwards the unknown flow, or related information thereof, to the statistical analyzer (104) to be added to a training set (121) for generating a new signature subsequently. In one or more embodiments, the flow (115a), or related information thereof, may be sent from the data collector (102) to the statistical analyzer (104) directly bypassing the classifier (103), for example when there is no signature in the signature library (131) initially.

In one or more embodiments, the statistical analyzer (104) is configured to identify the training set (121) from a set of flows (i.e., a flow-set, such as the set of unidirectional flows (115b)), or captured payloads thereof, based on a pre-determined criterion. The training set may be identified using many different schemes such that the training set is a statistically representative subset of flows associated with a particular network application. In one or more embodiments, the training set (121) includes the captured payloads and other relevant portion of the statistically representative subset of flows. An example method of identifying the training set from a cohesive flow-set is described in U.S. patent application Ser. No. 13/038,125 filed Mar. 2, 2011 and entitled "System and Method for Determining Network Application Signatures Using Flow Payloads," which is incorporated herein by reference.

In one or more embodiments, each server contributing to the training set (121) is tagged with a network application. For example, such network application may be tagged based on the Internet Assigned Numbers Authority (IANA) standard. Another example method for tagging a server with a network application is described in U.S. patent application Ser. No. 12/104,723 filed Apr. 17, 2008 and entitled "System and Method for Internet Endpoint Profiling," which is incorporated herein by reference. In one or more embodiments, the server profiler (105) tallies the number of servers executing each of the tagged network applications to identify the network application executing on a maximum number of servers in the tallied result as the particular network application associated with the training set. In one or more embodiments, flows associated with different network applications than the particular network application identified by the server profiler (105) are explicitly eliminated from the training set. In one or more embodiments, flows associated with different network applications than the particular network application identified by the server profiler (105) remains in the training set with their contribution to signature generation implicitly suppressed based on the signature generation algorithm.

In one or more embodiments, the signatures stored in the signature library (131) may be qualified using the distiller (107). For example, the distiller (107) may be configured to perform various tasks described below.

First, the distiller (107) expires signatures characterized by long inactivity time, i.e., the last time a flow was matched those signatures by the classifier (103) exceeded a pre-specified internal threshold. This task is referred to as signature-expiration process.

Second, for the remainder signatures in the signature library (131), the distiller (107) provides an indicator that reflects the overall quality of the signatures present in the signature library (131) such as to alert the situations in which distinct signatures may look similar. This second task is referred to as signature quality estimation process.

Third, distiller (107) decides whether a new signature can be appropriately added to the signature library (131) without compromising the quality of the current signatures. A set of signatures is said to be of good quality if the signatures constituting the set are dissimilar from each other based on a pre-determined similarity measure. This task is referred to as signature-specific quality estimation process.

Fourth, the distiller (107) is responsible to optimize the signature library (131) by deciding which signatures can be consolidated, i.e., appending more than one signature to the same network application. This task is referred to as signature consolidation process.

Figure 3A:
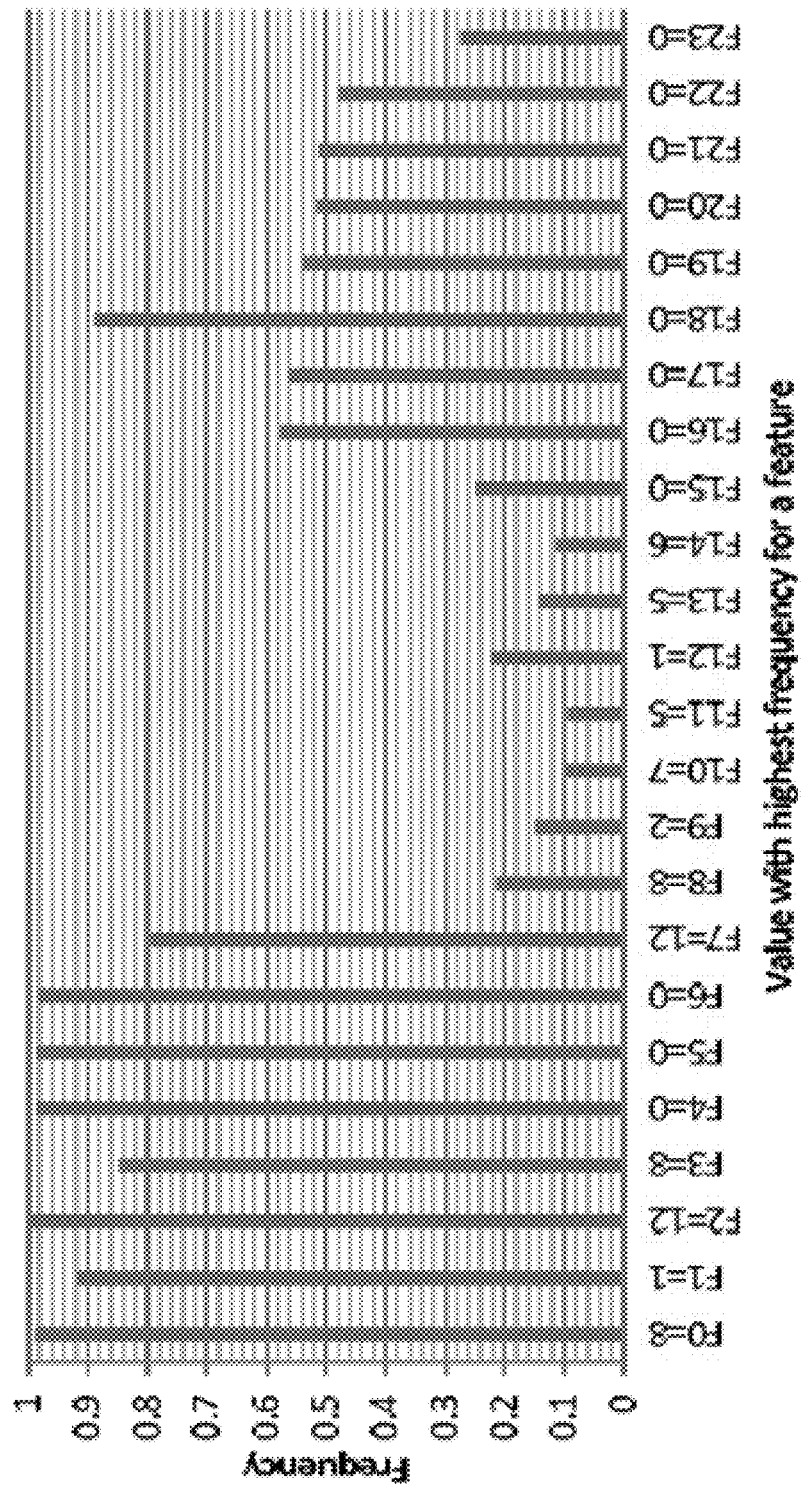
FIGS. 3A-3E show various examples according to aspects of the invention.
Figure 3B:
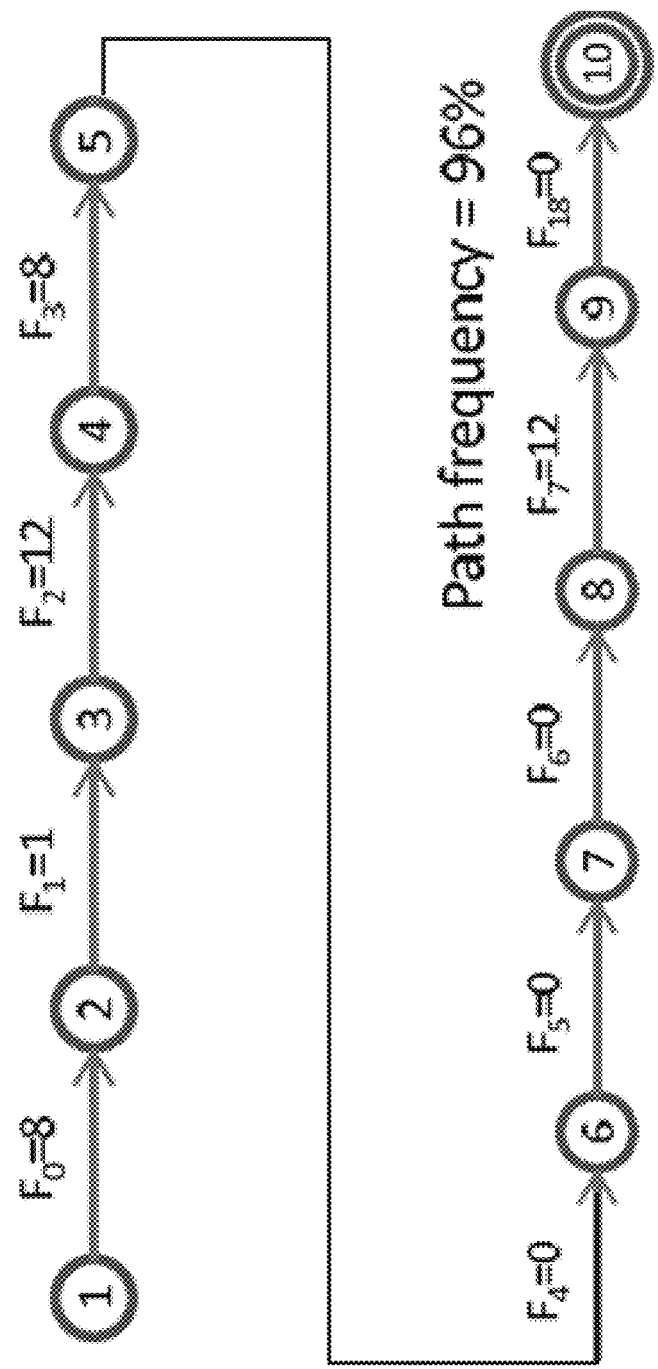

In one or more embodiments, the classifier (103) is configured to match a newly received flow (e.g., flow (113a)) to the state machine (135). In particular, the newly received flow is not part of the training set. The flow (113a) is said to match the state machine (135) if the flow (113a) contains all paths (i.e., all states and state transitions) of the state machine (135). Example state machines having states, state transitions, and paths are shown in FIGS. 3A and 3B below.

Figure 2A:
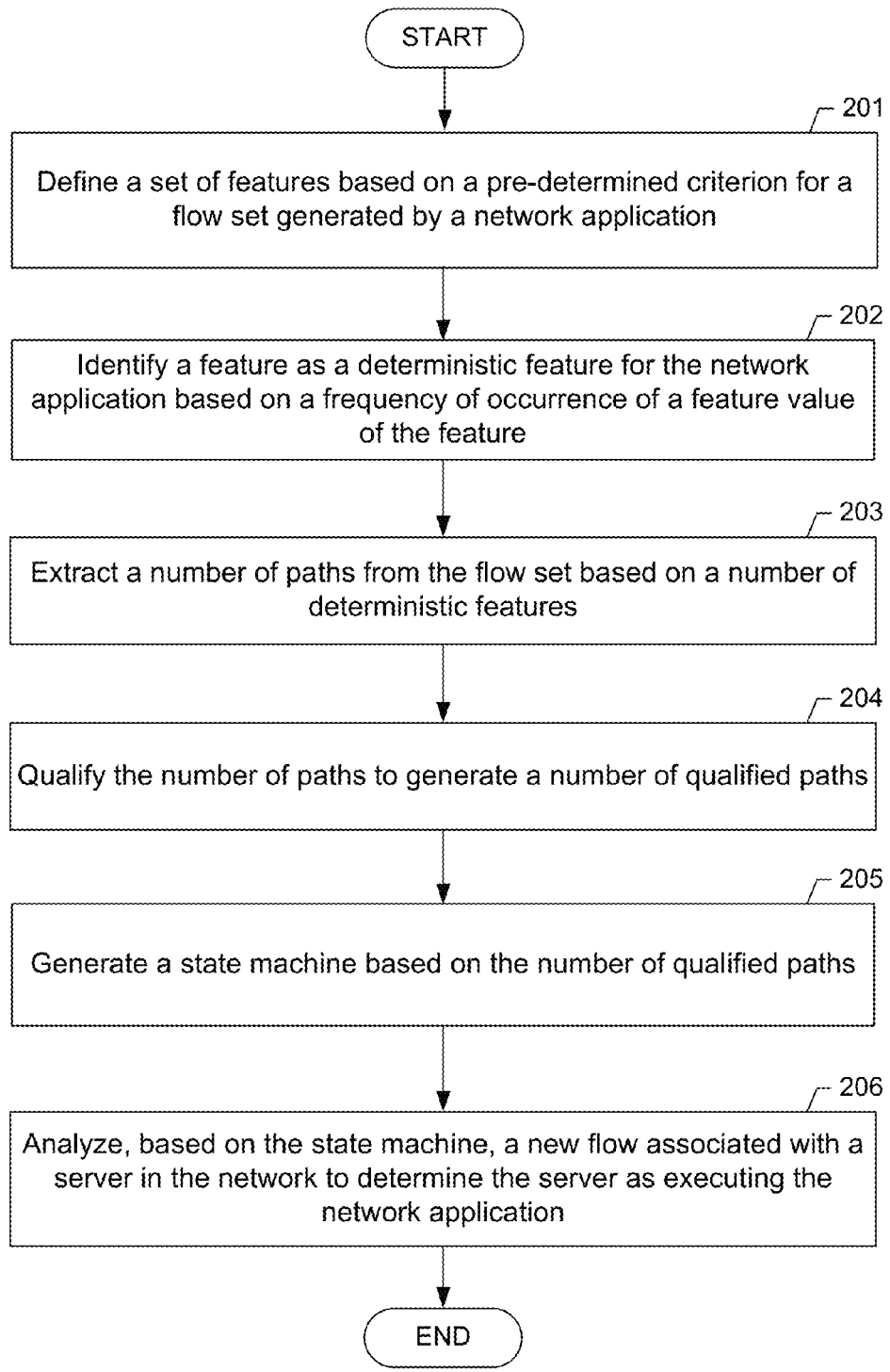
FIGS. 2A and 2B show flowcharts of a method according to aspects of the invention.
Figure 2B:
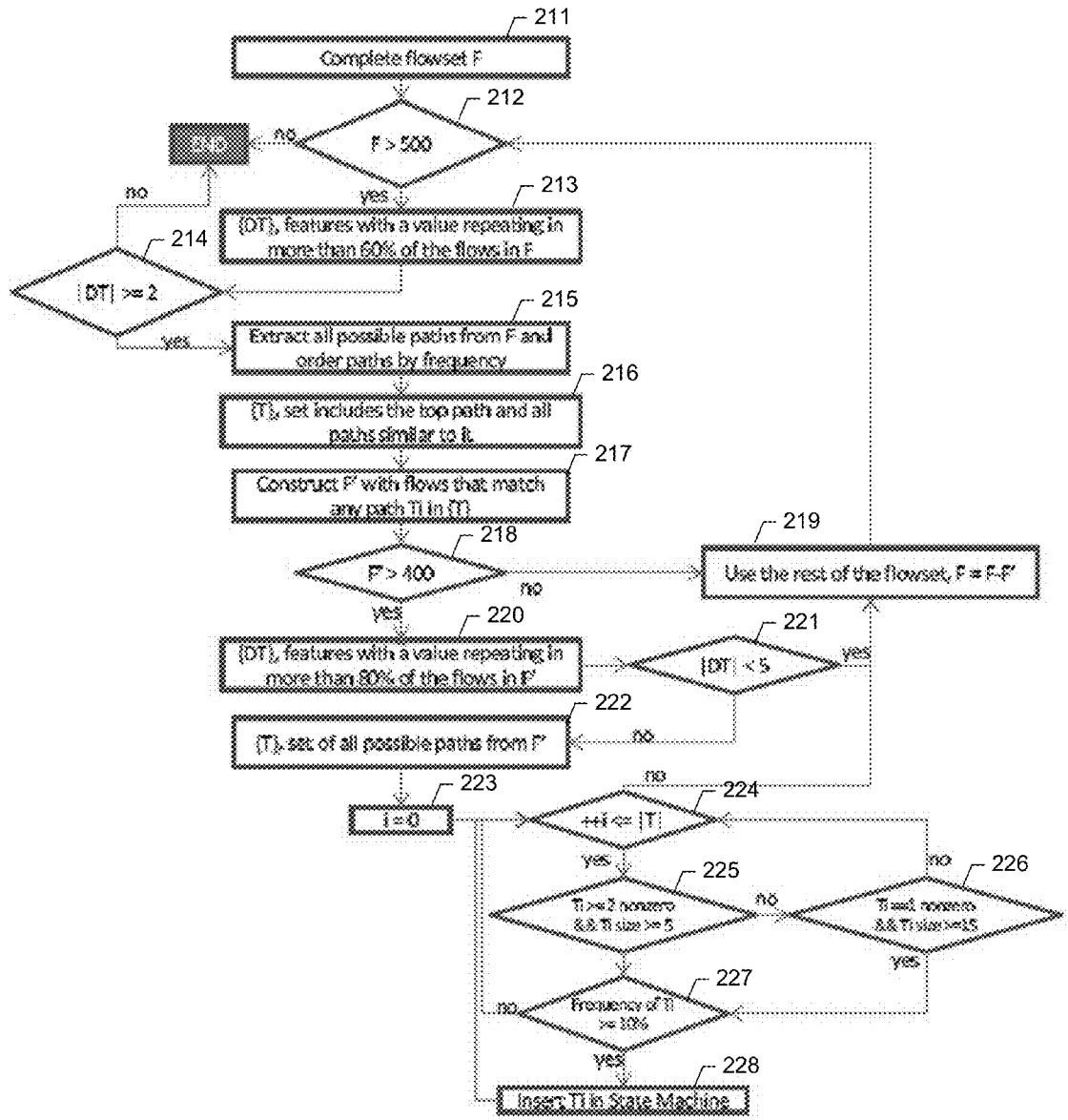

FIGS. 2A and 2B depict flowcharts of a method in accordance with one or more embodiments of the invention. In one or more embodiments of the invention, one or more of the steps shown in FIGS. 2A and 2B may be omitted, repeated, and/or performed in a different order. Accordingly, embodiments of the invention should not be considered limited to the specific arrangements of steps shown in FIGS. 2A and 2B. In one or more embodiments of the invention, the method depicted in FIGS. 2A and 2B may be practiced using system (100) described with respect to FIG. 1 above.

Turning to the discussion of FIG. 2A, initially in Step 201, a set of features is defined based on a pre-determined criterion for a flow set generated by a network application. In this context, a flow may be represented by the aforementioned 5-tuple and two flows of opposite direction that belong to the same UDP session are considered separately. In one example, for each of the applications evaluated, there is a "0.0" or a "0.1" at the end of the application name. "0.0" represents the given application flows in the client to server direction and "0.1" represents the given application flows in the server to client direction. For example, for the network application "BitTorrent," bittorrent.0 (client to server flows) and bittorrent.1 (server to client flows) may be evaluated separately. In another example, flows in only one of the directions are evaluated for the network application "Gnutella," e.g., flows for gnutella.0 is evaluated but flows for gnutella.1 may be ignored. In order to avoid biasing the resulting signature using a flow set where most flows go to a few servers, a maximum number/count of flows is imposed for the flow set where the same server is involved. In addition, a sufficiently large number of flows for the network application are required in the training set in order to generate a signature with statistical significance.

As described in reference to FIG. 1 above, captured payloads are extracted from flows in the flow set to form the training set and FDWs are defined that in turn define the set of features. In general, each of the features corresponds to a number of pre-determined bit positions in the sequence of data bits of a captured payload for selecting a pre-determined number of data bits from the sequence of data bits. Accordingly, the pre-determined number of data bits are selected from the sequence of data bits for each flow in the flow set to form a feature value assigned to the feature for the particular flow. In one or more embodiments, at least a portion of the pre-determined positions for each captured payload are located within the beginning portion of the packet that contains the application header of the UDP-based binary protocol, which is typically contained within the first 12-48 bytes in every packet since UDP is not connection oriented.

In one or more embodiments, consecutive FDWs with fixed length that are positioned at the beginning of each captured payload may be used. For example, each feature may correspond to a data nibble (i.e., four consecutive binary data bits) in the captured payload where 24 data nibbles at the beginning of each captured payload may be used to define 24 features. In another example, 48 data nibbles at the beginning of each captured payload may be used to define 48 features.

In Step 202, a feature is identified as a deterministic feature for the network application based on a frequency of occurrence of a feature value of the feature occurring throughout all captured payloads in the flow set. In one or more embodiments, the feature is identified as one of the deterministic features if it has at least one feature value having a frequency of occurrence exceeding a pre-determined frequency threshold.

FIG. 3A shows 24 features F0-F23 defined for RTCP protocol. In FIG. 3A, each feature corresponds to a data nibble and therefore can have any of 0-15 (i.e., possible BCD values of a 4-bit data nibble) as the feature value. The x-axis shows the feature id (F0 to F23 representing the first through the $24^{th}$ data nibble in the captured payload) and the most frequently occurring value for each feature in the format of (feature: feature value) pair identifying the most frequently occurring feature value. For example, F8=8 means that 8 (i.e., BCD value of the data nibble 1000) is the most commonly occurring feature value for the feature F8 (or the $9^{th}$ nibble in the captured payload) throughout all captured payloads in the training set. The y-axis shows how frequent the feature value of the feature occurs. The vertical bar for F8=8 is very close to 0.2 on the y-axis. This means that the value 8 occurs in approximately 20% (i.e., 0.2) of all captured payloads in the training set for the feature F8. Said in other words, the most frequently occurring feature value for the feature F8 has a frequency of occurrence of 0.2. In this example, the frequency of occurrence has the same scale as probability of occurrence. In other examples, the frequency of occurrence may be based on other different scales, such as 20 times per 100 captured payloads that is the same as 20% or 0.2.

The example statistics of RTCP protocol shown in FIG. 3A is based on the most common value for features in a 24-hour trace from a European service provider with millions of customers and millions of RTCP flows considered. In particular, UDP flows that belong to the RTCP protocol in the 24-hour trace are collected into the flow set from which the statistics shown in FIG. 3A are derived. Applying 0.6 as an example of the aforementioned pre-determined frequency threshold to the statistics in FIG. 3A, 9 features (i.e., F0, F1, F2, F3, F4, F5, F6, F7, and F18) are identified as deterministic features while the rest of features are identified as random features. TABLE 1 shows an example algorithm for identifying deterministic features in a flow set.

In Step 203, a number of paths are extracted from the flow set (or the training set generated from the flow set) based on the identified deterministic features. In one or more embodiments, each payload in the training set is represented by a sequence of (deterministic feature: deterministic feature value) pairs contained in it. For each payload in the RTCP example shown in FIG. 3A, the sequence of (deterministic feature: deterministic feature value) pairs is formed by discarding any nibble containing a random feature value in the first 24 nibbles in the payload. Such sequence of (deterministic feature: deterministic feature value) pairs containing at least two (deterministic feature: deterministic feature value) pairs is referred to as a path. Accordingly, one or more path can be extracted from each payload containing more than at least two (deterministic feature: deterministic feature value) pairs.

TABLE 1

Figure 3C:
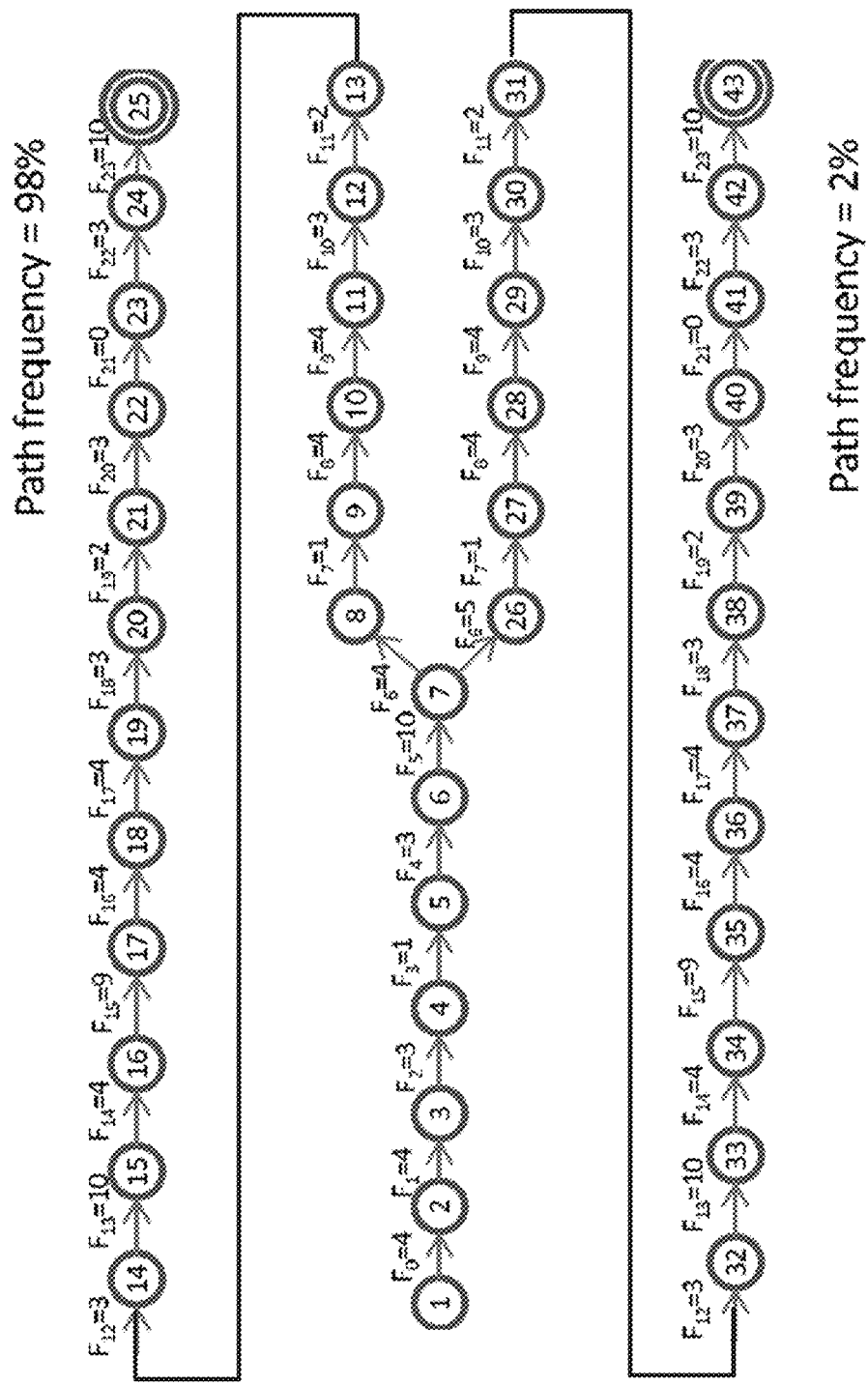

Algorithm 1: Generating common feature: value pairs input: Flowset for application A
output: List of common feature: value pairs
foreach Flow i in Flowset do   // Inspect all input flows bytes ← GetBytes(i, nbytes);   // read payload's first nbytes for $j \leftarrow 0$ to $\left(\frac{8}{nbits} * nbytes\right) - 1$ do   // for every nbits group
  (i.e. feature)

valve ← GetNextBits(i, j * nbits, nbits);   // index into j * nbits position and read nbits
    features[j][valve] ← features[j][valve] + 1;   // increment counter for valve taken by feature j
  end end for $i \leftarrow 0$ to $\left(\frac{8}{nbits} * nbytes\right) - 1$ do   // for each nbits groups
(i.e. feature)

for $j \leftarrow 0$ to $2^n$ bits do   // for each possible value a feature can take
    if $\frac{features[i][j]}{flowsetsize} >$ featureth then   // check if frequency of value is high enough
    | Push(common, i);   // store feature in list common
    end
  end end In the final result depicted in Step 205, the signature is generated as a finite state machine by analyzing all extracted paths from the training set. In one or more embodiments, a state in the state machine corresponds to a selected deterministic feature in the extracted paths, where a state transition in the state machine corresponds to two sequential deterministic features selected from the extracted paths. In one or more embodiments, the selected deterministic feature and the two sequential deterministic features are selected based on a pre-determined algorithm, such as the algorithm shown in TABLE 2 and/or FIG. 2B. As an example, FIG. 3B shows the signature generated for the RTCP protocol. There is one single path, and the complete state machine has 10 states correspond to the aforementioned 9 deterministic features F0, F1, F2, F3, F4, F5, F6, F7, and F18 plus the end state. Notice that this path occurs 96% of all RTCP flows (i.e., UPD flows originating from RTCP protocol). In another example, FIG. 3C shows the signature generated for the BitTorrent protocol. There are two possible paths, and the complete state machine has 43 states. Notice that the top path occurs 98% of the times in BitTorrent flows and the bottom path occurs 2% of the times.

Before generating the signature, the extracted paths are qualified to generate a number of qualified paths in Step 204. The rationale for the qualification is as follows:

(i) Some applications may have several modes of operation, some of which are very unlikely to be shown in the first few packets of a flow. This may cause a large number of possible paths in the final state machine. Since it is one of the goals to minimize false positives, paths that have a probability of occurrence of less than a given threshold is discarded. This can potentially affect recall, but precision will not be affected. An additional benefit of pruning low probability paths is that the database of signatures can be kept small. (ii) Some protocols may not have enough deterministic feature values, so the final signature will be short. The signatures are required to have a minimum number of (deterministic feature: deterministic value) pairs (e.g., minimum 5 pairs). Shorter signatures are discarded since they can increase false positives. (iii) The zero values are observed to occur more frequently than other feature values. In an example, for 50% of signatures, more than 45% of the feature values in the signature are zero. This clearly shows that zero values dominate the feature value space. Then, considering signatures with large fraction of zero values may lead to an increase in false positives, so signatures with very few non-zero values are discarded. For example, a requirement may be set that at least one feature must have a value different than zero. (iv) If very different sets of header contents exist for the same network application, two or more separate signatures (or state machines) are generated for the same network application. TABLE 2 shows an example algorithm for qualifying the extracted paths and generating the state machine as the signature.

So far, an underlying assumption is maintained that the flow set, used to generate the signature for a network application, have been correctly classified as being generated by the network application. However, this is can be an optimistic case. In practical scenarios, impure flow sets (i.e., flow sets that include traffic from other (possibly unrelated) traffic) need to be addressed. A few scenarios where this could arise are: (i) obtaining a signature for all flows arriving a given server port, where a mix of applications may use the same port. (ii) obtaining a signature for flows for a network application having two or more very different modes of operation. Although one signature can be generated based on the method steps above, a much cleaner signature could be obtain if traffic for different application modes is considered in isolation.

In one or more embodiments, Step 204 performs a layer of pre-filtering to deal with impure flows in the flow set. FIG. 2B depicts an example flow chart of signature generation with pre-filtering. As shown in FIG. 2B, Steps 211 through 217 shows the pre-filtering of an impure flow set and Steps 218 through 228 shows the signature extraction for each of the flow sets obtained. Note that in case where a pure flow set is received as input, the pre-filtering step will generate a single flow set and eventually a single signature or state machine. However, if we flow sets with mixed traffic are used as input, potentially more than one signature will be generated.

TABLE 2

Algorithm 2: Generating state machine

| | |
|---|---|
| input: | Flowset for application A |
| output: | State machine (SM) for application A |
| foreach Flow i in Flowset do | // Inspect all input flows |
|   bytes ← GetBytes(i, nbytes); | // read payload's first nbytes |
|   path ← " "; | // cleanup variable path, which stores new state machine path |
|   for j ← 0 to $\left(\frac{s}{nbits} * nbytes\right) - 1$ do | // for every feature |
|     value ← GetNextBits(i, j*nbits, nbits); | // index into j*nbits position and read nbits |
|     if Exists common[j] then feature | // check if j is a dominant |
|       AddNewState(path, j, value); current path | // add feature and value to |
|     end | |
|   end | |
|   if Exists SM[path] then | // check if path was seen before |
|     SM[path].frequency ← SM[path].frequency + 1 path counter | // increment |
|   else | // if this is a new path |
|     SM[path] ← 1; | // initialize counter |
|   end | |
| end | |
| foreach path in SM do | // inspect all paths obtained |

TABLE 2-continued

Algorithm 2: Generating state machine

| | |
|---|---|
|   frequency ← $\frac{SM[path].frequency}{flowsetsize}$; | // computer frequency of the path |
|   if frequency < freqth then | // check if frequency is less than threshold |
|     PrunePath(SM[path]); | // prune path from the state machine |
|   end | |
|   if path.size < minfeatures then | // check if number of features on a path is less than threshold |
|     PrunePath(SM[path]); | // prune path from the state machine |
|   end | |
|   if path.nonzero < nonzero then | // check if number of non−zero features on a path is less than threshold |
|     PrunePath(SM[path]); | // prune path from the state machine |
|   end | |
| end | |

As noted above, one or more of the filtering/qualifying steps shown in FIG. 2B may be omitted, repeated, and/or performed in a different order. Initially in Step 211 of the flow chart shown in FIG. 2B, a flow set F is obtained containing flows generated by a single network application. In Step 212, the size of the flow set is checked to proceed to Step 213 only if it exceeds 500 flows. In Step 213, deterministic features are identified based on a minimum frequency of occurrence threshold of 0.6 (i.e., 60%) to form a set {DT}. In one or more embodiments, Steps 211 through 213 are performed using the algorithm shown in TABLE 1 above.

In Step 214, the number of deterministic features in the set {DT} is checked to proceed to Step 215 only if at least two deterministic features are identified for the flow set and contained in the set {DT}. In Step 215, all possible paths based on (deterministic feature: deterministic feature value) pairs are extracted from all captured payloads in the flow set and ordered by frequency of occurrence of each path in the flow set.

In Step 216, a top path is selected from all the extracted paths that have a highest frequency of occurrence exceeding any frequency of occurrence of any other path in the extracted paths. Additional paths are selected if a similarity measure between the top path and the selected path exceeds a pre-determined similarity threshold. For example, the similarity measure may be based on the percentage of (deterministic feature: deterministic feature value) pairs that exist in both the top path and the selected path. The top path and all selected similar paths together form a set {T}. In one or more embodiments, {T} represented the qualified paths to be used in generating the state machine as the signature. In other embodiments, {T} may be further qualified as follows.

In Step 217, a filtered flow set F' is generated from the flow set F by selecting only those flows containing at least one path in {T}. In Step 218, the size of F' is checked to proceed to Step 220 only if F' contains at least 100 flows. Otherwise, the rest of flow set F-F' is obtained as the input flow set to return to Step 212.

In Step 220, the set of deterministic features {DT} is qualified by discarding any deterministic feature of which the deterministic feature value has a frequency of occurrence less than 0.8 (i.e., 80%). Said in other words, certain deterministic features are discarded by raising the frequency threshold from 0.6 used in Step 213 to 0.8. In Step 221, the size of the qualified {DT} is checked to proceed to Step 222 only if the qualified {DT} contains at least 5 deterministic features. Otherwise the flow chart proceeds to Step 219.

Step 222, the set {T} is reconstructed by extracting further selected paths from flows in F', wherein each of the further selected paths comprises at least two deterministic features in {DT} and is extracted from one of the flows in F'. In one or more embodiments, the reconstructed set {T} represents the qualified paths to be used in generating the state machine as the signature. In other embodiments, the reconstructed set {T} may be further qualified as follows.

Steps 223 through 228 form an iteration loop to qualify each path (one path per iteration loop) in the reconstructed set {T} to identify qualified paths for generating the state machine as the signature. In particular, Step 223 initializes the iteration loop count while Step 224 increments the iteration loop count until all paths in the reconstructed set {T} have been qualified.

In Step 225, a path in the reconstructed set {T} is qualified based on a number of non-zero valued features in the path exceeding a pre-determined non-zero value feature count threshold. For example, 2 is used as the non-zero value feature count threshold in Step 225. In addition in Step 225, a path in the reconstructed set {T} is qualified based on a number of features belonging to {DT} in the path exceeding a pre-determined feature count threshold. For example, 5 is used as the feature count threshold in Step 225. Unqualified paths from Step 225 is further checked in Step 226 where a path has few non-zero valued features is still qualified if it contains a large number of features belonging to {DT}. In Step 227, a path in the reconstructed set {T} is qualified based on a frequency of occurrence exceeding a pre-determined threshold, e.g., 10%. In one or more embodiments, Steps 220 through 228 are performed using the algorithm shown in TABLE 2 above. Although specific threshold values are used in various decision boxes in FIG. 2B, different thresholds may also be used.

Returning to the discussion of FIG. 2A, in Step 206, a new flow associated with a server in the network is analyzed using the signature state machine to determine the server as executing the network application. Once all state machines have been generated from flow sets generated from various network applications, they are stored in memory. Then, in the testing environment, when the first packet from a new flow is collected, the bit string (e.g., 24 bytes or 48 nibbles) is passed to the classifier, which will compare it against all existent state machines to find a match. In the case where there is more than one match, the signature with the longest number path or largest number of states is selected. When comparing the bit string to a state machine, the bit string is first converted to a path of consecutive data nibbles. The path is traversed during the comparison, transitions between states happen when the deterministic feature value of a deterministic feature occurs in the path. When the final state is reached in the finite state machine, the packet (and the corresponding flow) is determined as matched to the state machine and is classified as belonging to (or generated by) the network application associated with the signature.

Figure 3D:
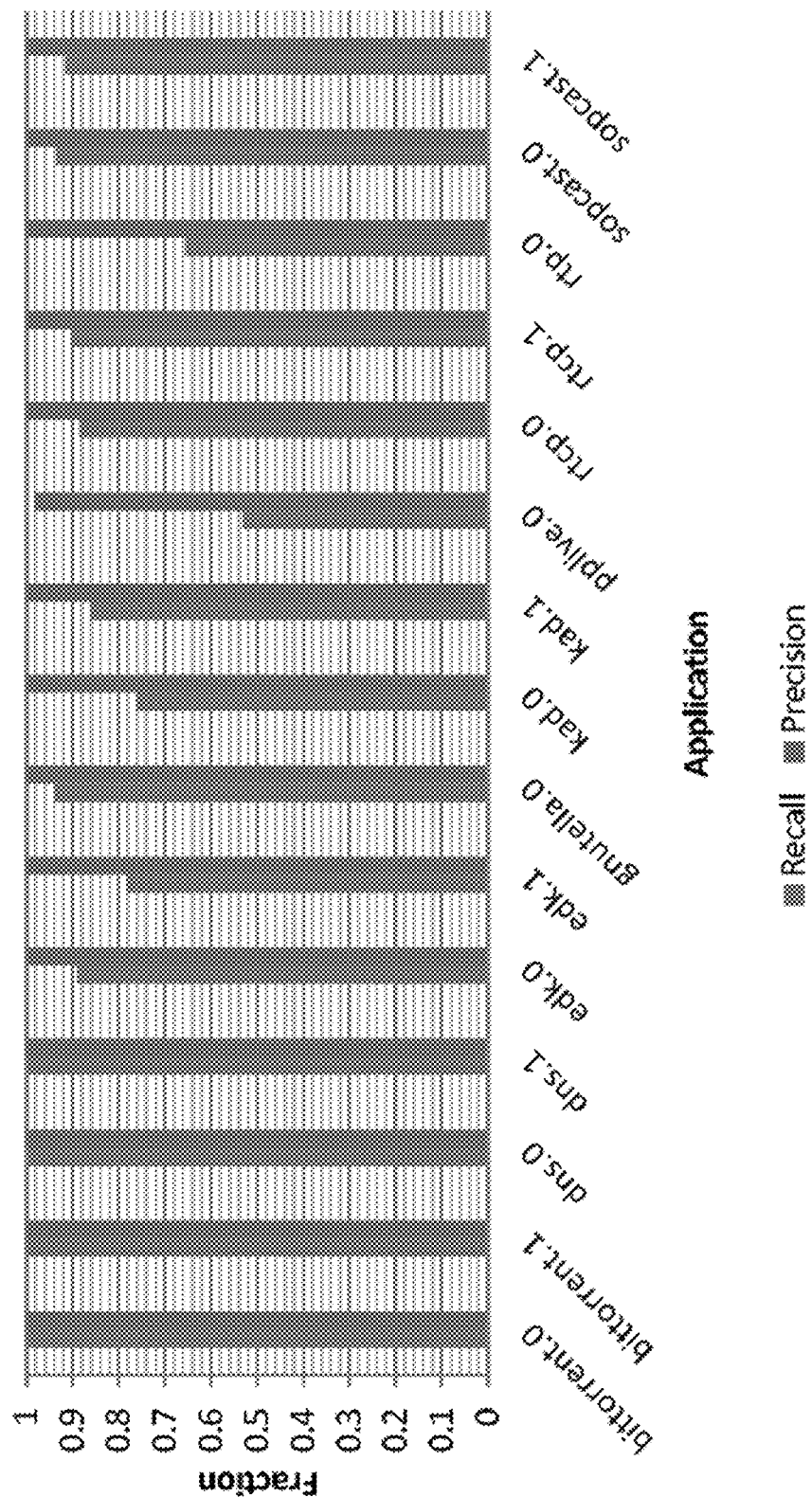
Figure 3E:
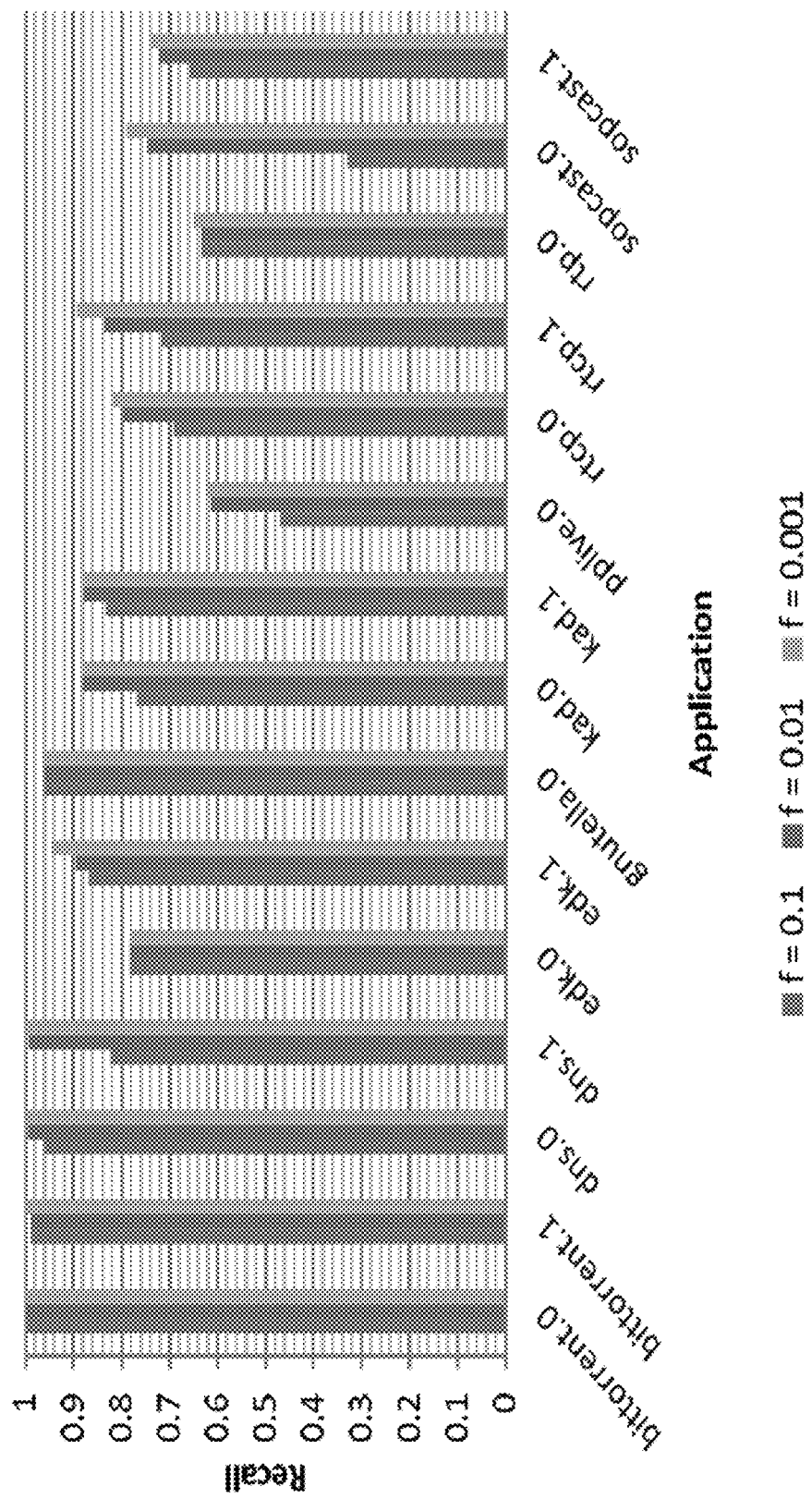

FIGS. 3D and 3E show application example results in accordance with embodiments of the invention. In the example, 24 hours of traces from a European ISP is used. The trace consists of hundreds of millions of flows. Ground truth is generated by using deep packet inspection to identify flows that are generated by particular applications. For each application with available ground truth, 3000 flows are selected for training. These training flows have to be received by at least 100 distinct servers to ensure that a diversity of endpoints is being used to generate the signature. For the results presented in FIGS. 3D and 3E, flows collected in the first 18 hours of the 24 hour period is used for training data and flows collected in the last 6 hours of the 24 hour period is used for testing data.

The evaluation metric is defined as follows. True positives for application A is the number of flows for application A that the method has correctly classified as belonging to application A. False positives for application A is the number of flows that were classified as application A but that belong to a different application. False Negatives for application A is the number of flows that belong to application A but that were classified as belonging to a different application. The main evaluation metrics are defined as:

$$\text{Precision} = \frac{\text{true\_positives}}{\text{true\_positives} + \text{false\_positives}}$$

$$\text{Recall} = \frac{\text{true\_positives}}{\text{true\_positives} + \text{false\_negatives}}$$

FIG. 3D shows recall and precision for the case when 24 bytes from the beginning of packets are used to generate signatures. FIG. 3E shows sensitivity to f, the minimum frequency of occurrence of a path (denoted as freqth in TABLE 2) in order to be included in the state machine for the signature. There are 15 sets vertical bars shown in each of FIGS. 3D and 3E, one for each of the applications evaluated.

Although specific formats or structures are used as examples in the foregoing description regarding the flows, the captured payloads, the signature terms, filtering layer/qualification loop structures, etc., one skilled in the art, with the benefit of this disclosure, will recognize that other formats or structures may also be used in the system and methods described without deviating from the spirit of the invention.

Figure 4:
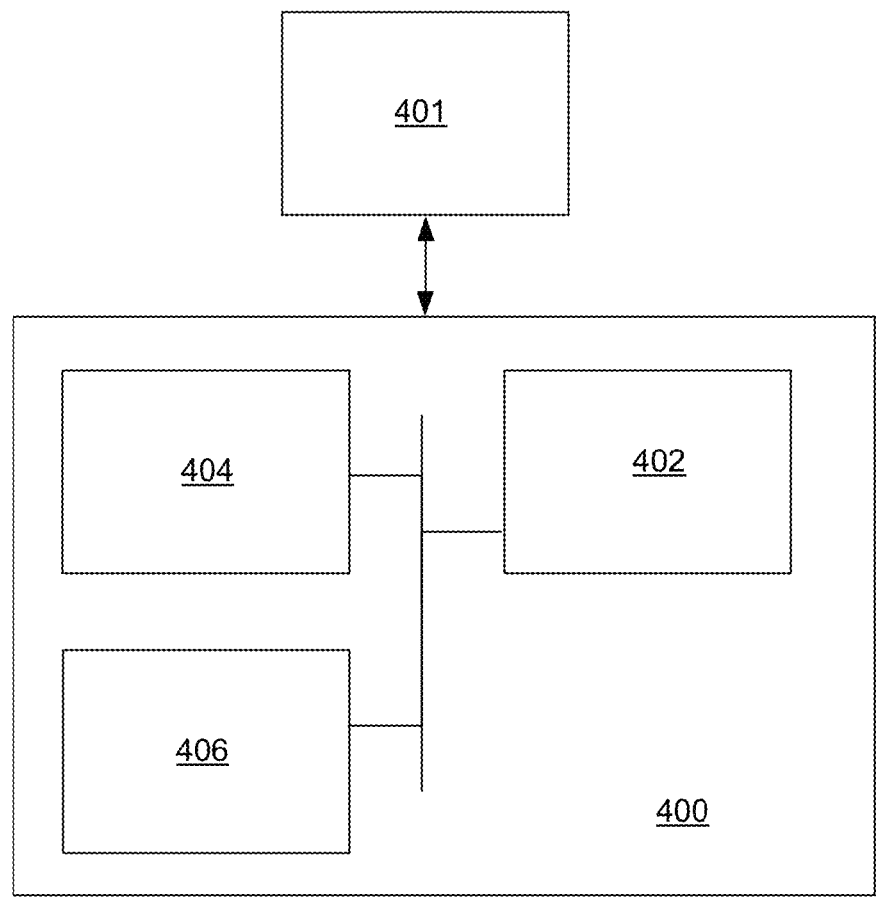
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling network traffic of a network, comprising:
    obtaining, from the network traffic, a plurality of flows associated with a network application, wherein each of the plurality of flows comprises a sequence of data bits;
    defining a plurality of features for the plurality of flows based on a pre-determined criterion,
        wherein a feature of the plurality of features corresponds to a plurality of pre-determined bit positions in the sequence of data bits for selecting a pre-determined number of data bits from the sequence of data bits, and
        wherein the pre-determined number of data bits are selected from the sequence of data bits for the each of the plurality of flows to form a feature value assigned to the feature for the each of the plurality of flows;
    identifying, by a processor of a computer system, the feature as one of a plurality of deterministic features for the network application based on a frequency of occurrence of the feature value in the plurality of pre-determined bit positions for all of the plurality of flows exceeding a pre-determined frequency threshold, wherein the feature value is identified as one of a plurality of deterministic feature values corresponding to the plurality of deterministic features;
    extracting, by the processor, a plurality of paths from the plurality of flows, wherein each of the plurality of paths comprises at least two deterministic features and is extracted from a flow, of the plurality of flows, having at least two deterministic feature values for the at least two deterministic features, respectively;
    generating, by the processor, a state machine based on the plurality of paths, wherein a state in the state machine corresponds to a selected deterministic feature in the plurality of paths, wherein a state transition in the state machine corresponds to two sequential deterministic features selected from the plurality of paths, wherein the selected deterministic feature and the two sequential deterministic features are selected based on a pre-determined algorithm; and
    analyzing, by the processor and based on the state machine, a new flow separate from the plurality of flows and associated with a server in the network to determine the server as executing the network application.

2. The method of claim 1,
    wherein each data bit in the sequence of data bits is a binary data bit,
    wherein the plurality of pre-determined bit positions comprise n pre-determined bit positions where n is an integer greater than one, and
    wherein the feature value is one of $2^n$ possible integer values represented by n data bit.

3. The method of claim 1,
    wherein each data bit in the sequence of data bits is a binary data bit,
    wherein the plurality of features correspond to a consecutive sequence of n-bit segments in the sequence of data bits, the pre-determined bit positions corresponding to a n-bit segment of the consecutive sequence of n-bit segments and identified by a sequence number of the n-bit segment thereof, and
    wherein the feature value is one of $2^n$ possible integer values represented by the n-bit segment.

4. The method of claim 1, further comprising:
    selecting, from the plurality of paths, a first selected path of a plurality of selected paths based on a frequency of occurrence of the first selected path exceeding any frequency of occurrence of any other path in the plurality of paths; and
    selecting, from the plurality of paths, a second selected path of the plurality of selected paths based on a similarity measure between the first selected path and the second selected path exceeding a pre-determined similarity threshold,
    wherein the state machine is generated based on the plurality of selected paths, and
    wherein the selected deterministic feature and the two sequential deterministic features are selected from the plurality of selected paths.

5. The method of claim 4, further comprising:
    selecting, from the plurality of flows, a selected flow of a plurality of selected flows based on the selected flow comprising at least one path in the plurality of selected paths;
    selecting, from the plurality of features, a selected feature of a plurality of selected features based on a frequency of occurrence of a corresponding deterministic feature value in a corresponding plurality of pre-determined bit positions for all of the plurality of selected flows exceeding a pre-determined extended frequency threshold; and
    extracting a plurality of further selected paths from the plurality of selected flows, wherein each of the plurality of further selected paths comprises at least two of the plurality of selected features and is extracted from one of the plurality of selected flows,
    wherein the state machine is generated based on the plurality of further selected paths, and
    wherein the selected deterministic feature and the two sequential deterministic features are selected from the plurality of further selected paths.

6. The method of claim 1, further comprising:
    selecting, from the plurality of paths, a selected path of a plurality of selected paths based on a number of nonzero valued features in the selected path exceeding a pre-determined non-zero value feature count threshold, wherein the state machine is generated based on the plurality of selected paths, and wherein the selected deterministic feature and the two sequential deterministic features are selected from the plurality of selected paths.

7. The method of claim 1, further comprising:

selecting, from the plurality of paths, a selected path of a plurality of selected paths based on a number of features in the selected path exceeding a pre-determined feature count threshold, wherein the state machine is generated based on the plurality of selected paths, and wherein the selected deterministic feature and the two sequential deterministic features are selected from the plurality of selected paths.

8. A system for profiling network traffic of a network, comprising:

a processor of a computer system;

a signature generator comprising first instructions executing on the processor and configured to:

define a plurality of features for a plurality of flows based on a pre-determined criterion, wherein the plurality of flows are associated with a network application and obtained from the network traffic, each of the plurality of flows comprising a sequence of data bits, wherein a feature of the plurality of features corresponds to a plurality of pre-determined bit positions in the sequence of data bits for selecting a pre-determined number of data bits from the sequence of data bits, and wherein the pre-determined number of data bits are selected from the sequence of data bits for the each of the plurality of flows to form a feature value assigned to the feature for the each of the plurality of flows;

identify the feature as one of a plurality of deterministic features for the network application based on a frequency of occurrence of the feature value in the plurality of pre-determined bit positions for all of the plurality of flows exceeding a pre-determined frequency threshold, wherein the feature value is identified as one of a plurality of deterministic feature values corresponding to the plurality of deterministic features;

extract a plurality of paths from the plurality of flows, wherein each of the plurality of paths comprises at least two deterministic features and is extracted from a flow, of the plurality of flows, having at least two deterministic feature values for the at least two deterministic features, respectively; and generate a state machine based on the plurality of paths, wherein a state in the state machine corresponds to a selected deterministic feature in the plurality of paths, wherein a state transition in the state machine corresponds to two sequential deterministic features selected from the plurality of paths, wherein the selected deterministic feature and the two sequential deterministic features are selected based on a pre-determined algorithm;

a classifier comprising second instructions executing on the processor and configured to analyze, based on the state machine, a new flow separate from the plurality of flows and associated with a server in the network to determine the server as executing the network application; and a repository configured to store the plurality of deterministic features, the plurality of deterministic feature values, and the state machine.

9. The system of claim 8, further comprising:

a profiler comprising third instructions executing on the processor and configured to identify the plurality of flows as associated with a network application; and a statistical analyzer comprising fourth instructions executing on the processor and configured to extract, from the plurality of flows, a training set comprising a plurality of captured payloads each comprising the sequence of data bits of one of the plurality of flows.

10. The system of claim 8, wherein each data bit in the sequence of data bits is a binary data bit, wherein the plurality of pre-determined bit positions comprise n pre-determined bit positions where n is an integer greater than one, and wherein the feature value is one of $2^n$ possible integer values represented by n data bit.

11. The system of claim 8, wherein each data bit in the sequence of data bits is a binary data bit, wherein the plurality of features correspond to a consecutive sequence of nibbles in the sequence of data bits, the pre-determined bit positions corresponding to a nibble of the consecutive sequence of nibbles and identified by a sequence number of the nibble thereof, and wherein the feature value is one of 16 possible integer values represented by the nibble.

12. The system of claim 8, the signature generator further configured to:

select, from the plurality of paths, a first selected path of a plurality of selected paths based on a frequency of occurrence of the first selected path exceeding any frequency of occurrence of any other path in the plurality of paths; and select, from the plurality of paths, a second selected path of the plurality of selected paths based on a similarity measure between the first selected path and the second selected path exceeding a pre-determined similarity threshold, wherein the state machine is generated based on the plurality of selected paths, and wherein the selected deterministic feature and the two sequential deterministic features are selected from the plurality of selected paths.

13. The system of claim 12, the signature generator further configured to:

select, from the plurality of flows, a selected flow of a plurality of selected flows based on the selected flow comprising at least one path in the plurality of selected paths;

select, from the plurality of features, a selected feature of a plurality of selected features based on a frequency of occurrence of a corresponding deterministic feature value in a corresponding plurality of pre-determined bit positions for all of the plurality of selected flows exceeding a pre-determined extended frequency threshold; and extracting a plurality of further selected paths from the plurality of selected flows, wherein each of the plurality of further selected paths comprises at least two of the plurality of selected features and is extracted from one of the plurality of selected flows, wherein the state machine is generated based on the plurality of further selected paths, and
wherein the selected deterministic feature and the two sequential deterministic features are selected from the plurality of further selected paths.

14. The system of claim 8, the signature generator further configured to:
select, from the plurality of paths, a selected path of a plurality of selected paths based on a number of non-zero valued features in the selected path exceeding a pre-determined non-zero value feature count threshold,
wherein the state machine is generated based on the plurality of selected paths, and
wherein the selected deterministic feature and the two sequential deterministic features are selected from the plurality of selected paths.

15. The system of claim 8, the signature generator further configured to:
select, from the plurality of paths, a selected path of a plurality of selected paths based on a number of features in the selected path exceeding a pre-determined feature count threshold,
wherein the state machine is generated based on the plurality of selected paths, and
wherein the selected deterministic feature and the two sequential deterministic features are selected from the plurality of selected paths.

16. A non-transitory computer readable medium embodying instructions for profiling network traffic of a network, the instructions when executed by a processor comprising functionality for:
obtaining, from the network traffic, a plurality of flows associated with a network application, wherein each of the plurality of flows comprises a sequence of data bits;
defining a plurality of features for the plurality of flows based on a pre-determined criterion,
wherein a feature of the plurality of features corresponds to a plurality of pre-determined bit positions in the sequence of data bits for selecting a pre-determined number of data bits from the sequence of data bits, and
wherein the pre-determined number of data bits are selected from the sequence of data bits for the each of the plurality of flows to form a feature value assigned to the feature for the each of the plurality of flows;
identifying the feature as one of a plurality of deterministic features for the network application based on a frequency of occurrence of the feature value in the plurality of pre-determined bit positions for all of the plurality of flows exceeding a pre-determined frequency threshold,
wherein the feature value is identified as one of a plurality of deterministic feature values corresponding to the plurality of deterministic features;
extracting a plurality of paths from the plurality of flows, wherein each of the plurality of paths comprises at least two deterministic features and is extracted from a flow, of the plurality of flows, having at least two deterministic feature values for the at least two deterministic features, respectively;
generating a state machine based on the plurality of paths, wherein a state in the state machine corresponds to a selected deterministic feature in the plurality of paths, wherein a state transition in the state machine corresponds to two sequential deterministic features selected from the plurality of paths, wherein the selected deterministic feature and the two sequential deterministic features are selected based on a pre-determined algorithm; and
analyzing, based on the state machine, a new flow separate from the plurality of flows and associated with a server in the network to determine the server as executing the network application.

17. The non-transitory computer readable medium of claim 16,
wherein each data bit in the sequence of data bits is a binary data bit,
wherein the plurality of pre-determined bit positions comprise n pre-determined bit positions where n is an integer greater than one, and
wherein the feature value is one of $2^n$ possible integer values represented by n data bit.

18. The non-transitory computer readable medium of claim 16,
wherein each data bit in the sequence of data bits is a binary data bit,
wherein the plurality of features correspond to a consecutive sequence of n-bit segments in the sequence of data bits, the pre-determined bit positions corresponding to a n-bit segment of the consecutive sequence of n-bit segments and identified by a sequence number of the n-bit segment thereof, and
wherein the feature value is one of $2^n$ possible integer values represented by the n-bit segment.

19. The non-transitory computer readable medium of claim 16, the instructions when executed by the processor further comprising functionality for:
selecting, from the plurality of paths, a first selected path of a plurality of selected paths based on a frequency of occurrence of the first selected path exceeding any frequency of occurrence of any other path in the plurality of paths; and
selecting, from the plurality of paths, a second selected path of the plurality of selected paths based on a similarity measure between the first selected path and the second selected path exceeding a pre-determined similarity threshold,
wherein the state machine is generated based on the plurality of selected paths, and
wherein the selected deterministic feature and the two sequential deterministic features are selected from the plurality of selected paths.

20. The non-transitory computer readable medium of claim 19, the instructions when executed by the processor further comprising functionality for:
selecting, from the plurality of flows, a selected flow of a plurality of selected flows based on the selected flow comprising at least one path in the plurality of selected paths;
selecting, from the plurality of features, a selected feature of a plurality of selected features based on a frequency of occurrence of a corresponding deterministic feature value in a corresponding plurality of pre-determined bit positions for all of the plurality of selected flows exceeding a pre-determined extended frequency threshold; and
extracting a plurality of further selected paths from the plurality of selected flows, wherein each of the plurality of further selected paths comprises at least two of the plurality of selected features and is extracted from one of the plurality of selected flows,
wherein the state machine is generated based on the plurality of further selected paths, and
wherein the selected deterministic feature and the two sequential deterministic features are selected from the plurality of further selected paths.

21. The non-transitory computer readable medium of claim 16, the instructions when executed by the processor further comprising functionality for:
  selecting, from the plurality of paths, a selected path of a plurality of selected paths based on a number of non-zero valued features in the selected path exceeding a pre-determined non-zero value feature count threshold,
  wherein the state machine is generated based on the plurality of selected paths, and
  wherein the selected deterministic feature and the two sequential deterministic features are selected from the plurality of selected paths.

22. The non-transitory computer readable medium of claim 16, the instructions when executed by the processor further comprising functionality for:
  selecting, from the plurality of paths, a selected path of a plurality of selected paths based on a number of features in the selected path exceeding a pre-determined feature count threshold,
  wherein the state machine is generated based on the plurality of selected paths, and
  wherein the selected deterministic feature and the two sequential deterministic features are selected from the plurality of selected paths.

* * * * *